UNITED STATES PATENT OFFICE.

ROBERT H. HENEMIER, OF NEW YORK, N. Y., ASSIGNOR TO A. SCHRADER'S SON, INCORPORATED, OF BROOKLYN, NEW YORK, A CORPORATION OF NEW YORK.

TIRE-VALVE.

1,296,516.　　　Specification of Letters Patent.　　Patented Mar. 4, 1919.

Application filed January 4, 1915. Serial No. 490.

*To all whom it may concern:*

Be it known that I, ROBERT H. HENEMIER, citizen of the United States, and resident of New York, in the county of and State of New York, have invented certain new and useful Improvements in Tire-Valves, of which the following is a specification.

My invention relates to valves for pneumatic tires and the like and consists in an improved construction thereof of few and substantial parts which are economically made and which in use will have important advantages over types of valves heretofore used.

A particular object of my invention is to produce a valve which may be positioned in a standard valve stem and removed therefrom by the simple manipulation of the valve by hand so as to obviate the necessity of employing a special tool therewith. As is readily understood, in valves where a tool is required, for instance a cap in its reversed position, it is not only inconvenient in the manner of its operation but it necessitates at all times having the required tool within reach. This is a decidedly troublesome factor when the tires are moved from place to place during repairing, etc.

To produce a successful thumb-screw valve I have devised an improved arrangement wherein the valve is provided with a thumb piece or manipulating flange, and is removable as a unit and wherein the valve unit when in position for sealing the stem will not be disturbed by the coupling and uncoupling of the connection from the pump or other inflating device. The latter feature is of the greatest importance in that it permits of placing the valve in position for sealing the stem under normal pressure applied by hand without danger of its being displaced by the hose connection, as aforesaid, or by the application of the usual cap.

In the accompanying drawing the reference characters of this description are applied to like parts in the several views.

Figures 1, 2:
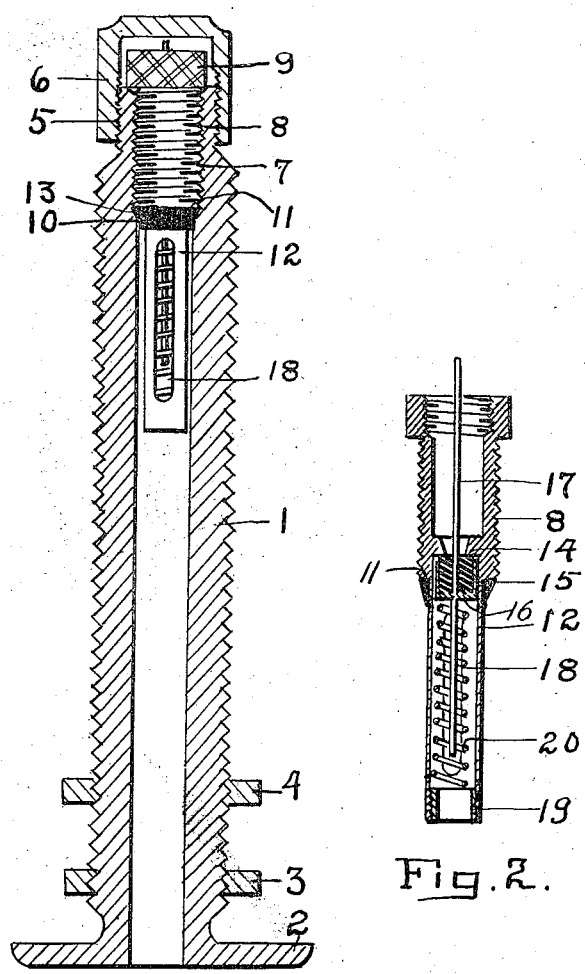
Figure 1 is a vertical section of a stem with the valve member shown in full lines.
Fig. 2 is a central vertical sectional view of the valve unit alone.

In my invention a stem 1 of standard form is provided with the usual flange 2 and nuts 3 and 4 for the purpose of securing the stem to the inner and outer casings of a pneumatic tire. The top of the stem has a reduced diameter 5 having screw threads and adapted to receive the cap 6 threaded to match.

Within the stem of the valve the screw thread 7 is adapted to receive the inside, threaded casing or socket 8 of the valve. The socket has a manipulating flange or a knurled top 9 by means of which it may be screwed by hand into the top of the stem. The socket has a rubber packing 10 in the form of a cone shaped band next to the shoulder 11 and surrounding the tubular portion 12 which forms an integral extension of the casing or socket 8. When the latter is secured in the stem the packing 10 rests against the valve seat 13 inside of the stem making an air tight joint between the two. The socket 8 has within it a valve seat 14 as shown in Fig. 2 against which rests the rubber valve 15 contained within the cup 16 which is secured to the central pin on wire 17 of the valve. The cup 16 fits the bore of the tubular portion 12 and is thus held squarely in position to tightly close the valve. Only when the cup is pressed downward past the upper end of the slots 18 does the air escape. When this happens the air passes out through the openings 18 which may have an area very much larger than in the ordinary tire valve and thereby permit rapid deflation as well as inflation. The tubular portion 12 is smaller than the bore of the stem thus permitting the air to escape by the annular passage around it.

Surrounding the pin 17 and pressing between the bottom of the cup 16 and the top of the threaded cylindrical portion 19 is the compression spring 20 adapted to hold the valve 15 against its seat.

What I claim and desire to secure Letters Patent for is:—

1. In a tire valve, the combination of a tubular stem member having its outer end portion threaded to receive a standard size coupling of an inflating device and a screw valve member for closing the stem threaded thereto and provided with an integral manipulating flange of a diameter less than said outer end portion and of slight depth to lie close to said end portion when in position so as to be freely inclosed within the coupling to permit of the connection being made independent of the valve member whereby the latter is not subjected to the strains to which the coupling is subjected, said valve member being formed with a valve seat, a normally yielding valve plunger arranged to engage the valve seat and a packing washer interposed between the valve member and the stem to form a permanent seal therebetween.

2. In a tire valve, in combination with the tubular stem member having its outer end threaded exteriorly to receive a standard size coupling of an inflating device, of a valve casing threaded within the stem provided with an integral manipulating thumb piece of a diameter less than the outer end portion and of slight depth to lie close to said end portion when in position so as to be freely inclosed within the coupling, said casing being formed with an interior valve seat and comprising a tubular extension having slots therein, a plunger within the casing, a spring within the casing for forcing the plunger to its seat and a packing washer surrounding the casing and engaging the interior of the stem to form an air seal.

3. In a tire valve the combination of a tubular stem member having its outer end portion threaded to receive a standard size coupling of an inflating device and a screw valve member for closing the stem threaded thereto and provided with a manipulating flange rigidly connected therewith of a diameter less than said outer end portion and of slight depth to lie close to said end portion when in position so as to be freely inclosed within the coupling to permit of the connection being made independent of the valve member whereby the latter is not subjected to the strains to which the coupling is subjected, said valve member being formed with a valve seat, a normally yielding valve plunger arranged to engage the valve seat and a packing washer interposed between the valve member and the stem to form a permanent seal therebetween.

Signed at New York, in the county of New York and State of New York, this 15th day of October, A. D. 1914.

ROBERT H. HENEMIER.

Witnesses:
MYRON F. HILL,
GLADYS FORD.